United States Patent
Müller et al.

(10) Patent No.: US 6,286,349 B1
(45) Date of Patent: Sep. 11, 2001

(54) FLATNESS MEASUREMENT SYSTEM FOR METAL STRIP

(75) Inventors: Ulrich Müller, Monheim; Gustav Peuker, Mönchengladbach; Detlef Sonnenschein, Essen; Detlef Winter, Meine; Michael Degner, Dortmund; Gerd Thiemann, Bochum, all of (DE)

(73) Assignees: Betriebsforschungsinstitut VDEh-Institut fur angewandte Forschung GmbH, Dusseldorf (DE); Gesellschaft fur Optische Messtechnik GmbH, Braunschweig (DE); Krupp-Hoesch-Stahl AG, Dortmund (DE)

( * ) Notice: Subject to any disclaimer, the term of this patent is extended or adjusted under 35 U.S.C. 154(b) by 0 days.

(21) Appl. No.: 09/441,007

(22) Filed: Nov. 16, 1999

Related U.S. Application Data

(62) Division of application No. 09/034,481, filed on Mar. 4, 1998.

(30) Foreign Application Priority Data

Mar. 11, 1997 (DE) .............................................. 197 09 992

(51) Int. Cl.$^7$ ..................................................... B21B 37/28
(52) U.S. Cl. ................................. 72/11.7; 72/9.1; 72/37
(58) Field of Search ............................ 72/9.1, 11.1, 11.6, 72/11.7, 201, 37; 356/601, 610; 250/559.05, 559.07, 559.08

(56) References Cited

U.S. PATENT DOCUMENTS

| | | |
|---|---|---|
| 3,731,508 | 5/1973 | Sabatini et al. . |
| 4,782,683 * | 11/1988 | Tippins et al. ......................... 72/11.7 |
| 4,785,646 * | 11/1988 | Uekaji et al. .......................... 72/201 |
| 4,809,528 * | 3/1989 | Lawson et al. ........................ 72/11.7 |
| 5,085,066 * | 2/1992 | Komani et al. ........................ 72/201 |
| 5,309,222 | 5/1994 | Kamei et al. . |
| 5,367,378 | 11/1994 | Harding et al. . |
| 5,488,478 | 1/1996 | Bullock et al. . |
| 5,996,384 * | 12/1999 | Steeper et al. ........................... 72/37 |

FOREIGN PATENT DOCUMENTS

| | | |
|---|---|---|
| 20 13 867 | 10/1971 | (DE) . |
| 37 21 746 | 1/1989 | (DE) . |
| 2 725 512 | 4/1996 | (FR) . |
| 62-9711 * | 1/1987 | (JP) ....................................... 72/201 |
| 2-229610 * | 9/1990 | (JP) ....................................... 72/201 |

OTHER PUBLICATIONS

European Search Report for EP 98 10 3890 (Feb. 23, 1999).

* cited by examiner

*Primary Examiner*—Ed Tolan
(74) *Attorney, Agent, or Firm*—Merchant & Gould P.C.

(57) ABSTRACT

The invention relates to a flatness measurement and control system for metal strip, which makes it possible to obtain improved strip or coil quality by a simple and effective measurement of departures from flatness and to control the finishing parameters through the evaluation of a line pattern on the strip surface or on the end face of a coil as it is coiled.

2 Claims, 4 Drawing Sheets

FLATNESS MEASUREMENT SYSTEM FOR METAL STRIP

This application is a Divisional of application Ser. No. 09/034,481, filed Mar. 4, 1998, which application(s) are incorporated herein by reference.

FIELD OF THE INVENTION

The invention relates to a flatness measurement and control system for metal strip and for the end faces of the coil when coiling strip.

BACKGROUND AND PRIOR ART

The contact measurement usually used in cold strip mills is only possible in the hot strip field at the expense of substantial outlay on maintenance, because of the high strip temperature of from about 1000° C. Contact measurement on the end faces of a coil being formed in a coiler is also not possible. It is therefore difficult, if not completely impossible, to coil strip in such a way that in the coil every turn lies exactly over the preceding one so that flat end faces are obtained. And even in cold strip mills efforts are made to avoid contact measurement, since the mechanical measuring elements have only a limited life.

Strip flatness is therefore preferably measured without contact. For example, it is known to measure departures from flatness by means of spots of light projected on to the strip. The position in space of the light spot produced on the surface of the strip, preferably by means of a laser beam, is detected using a range finder.

The two plane position coordinates of a particular point on the surface are known from the position of the scanning or illuminating beam relative to the surface of the strip. The height coordinate of the point on the surface which is currently being measured is detected by a position-sensitive sensor. The position of the image point on the sensor varies simultaneously with the height coordinate.

Using a large number of sources of radiation and sensors a flatness image can be built up over the whole width of the strip which is made up from the results of measurement of the spots of light projected on the strip at particular distances apart. Nevertheless, in this method the regions between the points of light are not detected an in the case of continuous strip from strip-shaped measurement gaps in which the flatness is not determined. Moreover, this can result in measurement errors, for example through wobbling or flattering of the strip being detected by the measuring method as uneveness of the strip.

In the automobile industry it is known to measure relatively small surfaces using the moiré technique. In this method an interference pattern is produced on the surface of the object by means of a light source. The interference pattern is detected using a CCD (charge-coupled device) camera. The camera is arranged so that an angle is formed between the light source, the surface and the camera. By the use of a reference grid in the image plane a so-called mioré effect is obtained by superposition of the detected pattern and the refernce pattern. The height differences can be determined quantitatively from the moiré lines.

The mioré technique provides more accurate measurement result than measurement using spots of light and moreover it covers substantially the whole of the surface to be measured and avoids the measurements gaps mentioned above. However, its use involves problems, particularly in a hot strip mill.

To determine the height differences of the rolled strip a complicated conversion of the pattern detected by the camera is necessary. The height differences pictured as mioré lines cannot be converted into quantitative measured values in real time.

But in a rolling mill train rapid results are precisely what is required from measurements, since otherwise it is hardly possible to use the measurement for direct adjustmente of the rolling parameters so as to improve the flatness of the continuous strip. Moreover for industrial application the fine interference patterns are lacking in contrast and intensity.

In the case of conventional metal strip mill trains, in which the strip flatness is measured by one of the above-mentioned methods, departures from flatness are not measured from the cooling line, and this can result in considerable loss in quality.

OBJECT OF THE INVENTION

The object of the invention is to provide a system which allows strep quality to be improved by a simple and effective measurement of the strip flatness and permits fine control of the rolling and/or coiling parameters.

SUMMARY OF THE INVENTION

To this end, a line pattern is produced on the measurement surface and/or on the end face of a coil being formed, the line pattern is detected by a camera which can resolve the line pattern, and the measurement data obtained are compared with a reference measurement. By means of a process control computer the measurement results are directly converted into control parameters for the finishing train and the coiler and coordinated.

By measurement surface is to be understood here the surface of the strip or, in the case of coiling, the end face of a coil made up of a larger or smaller number of turns of the strip.

A projector produces by projection, for example through a slide, a line pattern on the strip surface or the end face of the coil corresponding to the resolution of the camera. For this purpose the projector is mounted above the metal strip and projects the line pattern on the surface of the metal strip at an angle to the vertical, so that the lines preferably run transverse to the strip surface and consequently take in the whole width of the strip.

A CCD camera having a resolution of, for example, eight pixels per line detects the lines running transversely across the strip surface. In the event of absolute flatness or the strip a uniform pattern of straight lines with constant line spacing is formed.

Deviations of the strip surface from the ideal plane bring about a change in the spacing between the lines in the region of the unevenness. This change is recorded by the camera. It can be converted by calculation in a simple manner into differences in height by a comparison with an ideal pattern.

In a similar manner to the measurement of flatness on the continuous strip, the flatness of the end faces during coiling can be monitored and ensured by means of the measuring system of the invention. The end face of the coil being formed in the coiler then corresponds to the strip surface.

The system in accordance with the invention makes possible a rapid determination of the actual height differences of the strip surface and in this way permits measurement of continuous lengths of strip in real time. This has the advantage that the measurement results permit the rolling parameters to be adapted immediately after the appearance of an uneveness.

The invention makes possible a measurement which is insensitive to spurious measurement results. Such spurious results are obtained with conventional measuring systems for example as a result of movement of the whole strip surface relative to the height coordinate (fluttering). Furthermore, the invention allows the transverse arching of the strip to be determined. Conventional measuring systems only measure the length of the strip fibres. In addition the intensity and thickness of the measurement lines can be adapted to meet different conditions. The problems of the fine, low-intensity and low-contrast moiré lines do not occur.

The system of the invention is particularly suitable for making a measurement on the strip emerging from the finishing stands combined with a measurement of the strip on the coiler. By this arrangement variations in the flatness of the strip due to cooling of the strip between the finishing stands and the coiler can be detected and evaluated for flatness control.

The measurement data can be evaluated for control of the finishing stands and of the coiler and for control of the coiling line.

Measurement results which incorporate a departure from an intended value bring about an immediate and interdependent adaptation of the parameters for the finishing stands, the cooling line and the coiler.

Besides its use for measurement of flatness in a finishing train the system in accordance with the invention can also be used in subsequent production lines, for example in the control of stretch straightening devices and in pickling lines.

BRIEF DESCRIPTION OF THE DRAWINGS

The invention will now be described in more detail, by way of example, with reference to an embodiment illustrated in the drawings, in which.

DETAILED DESCRIPTION OF A PREFERRED EMBODIMENT OF THE INVENTION

Figure 1:
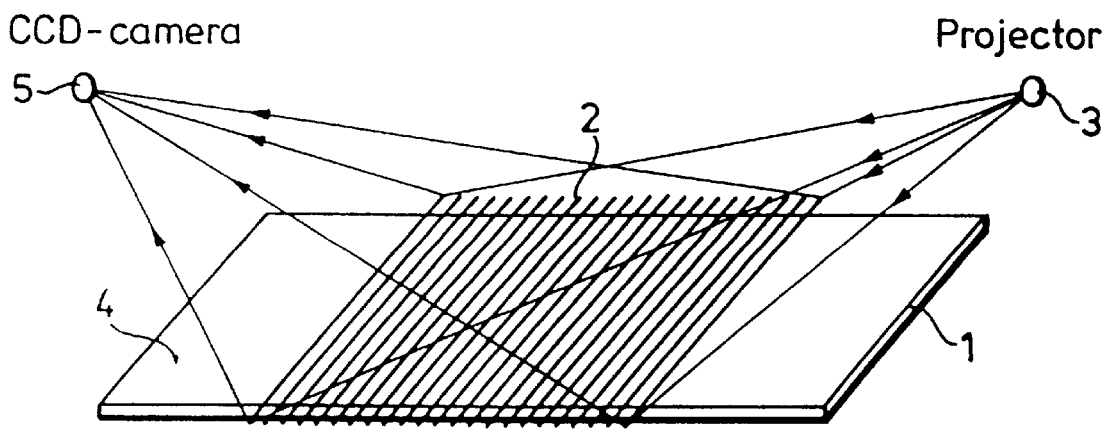
FIG. 1 shows the production and detection of the measurement lines on a length of strip.
Figure 2:
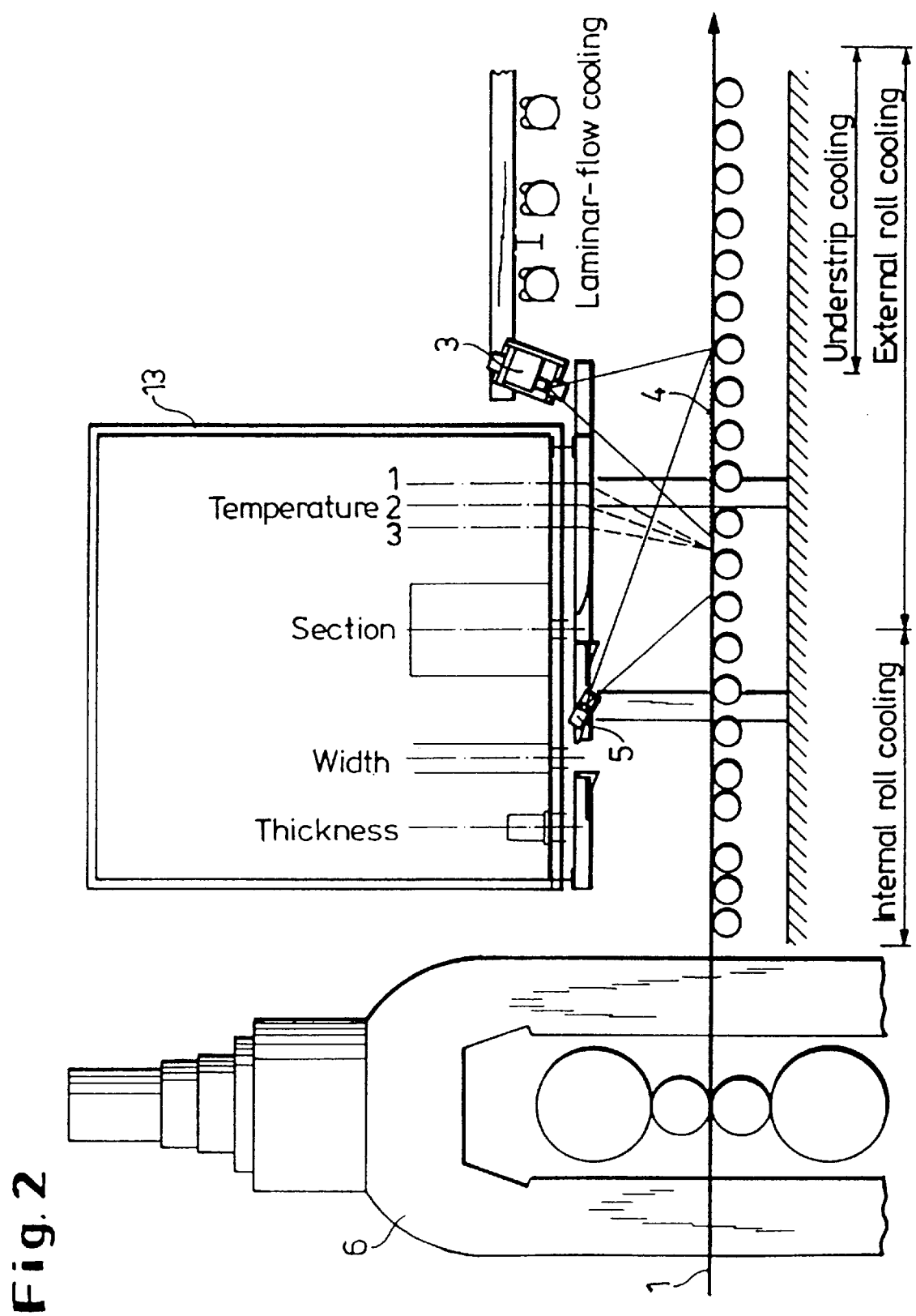
FIG. 2 shows a protector and a camera arranged after a finishing train.
Figure 3:
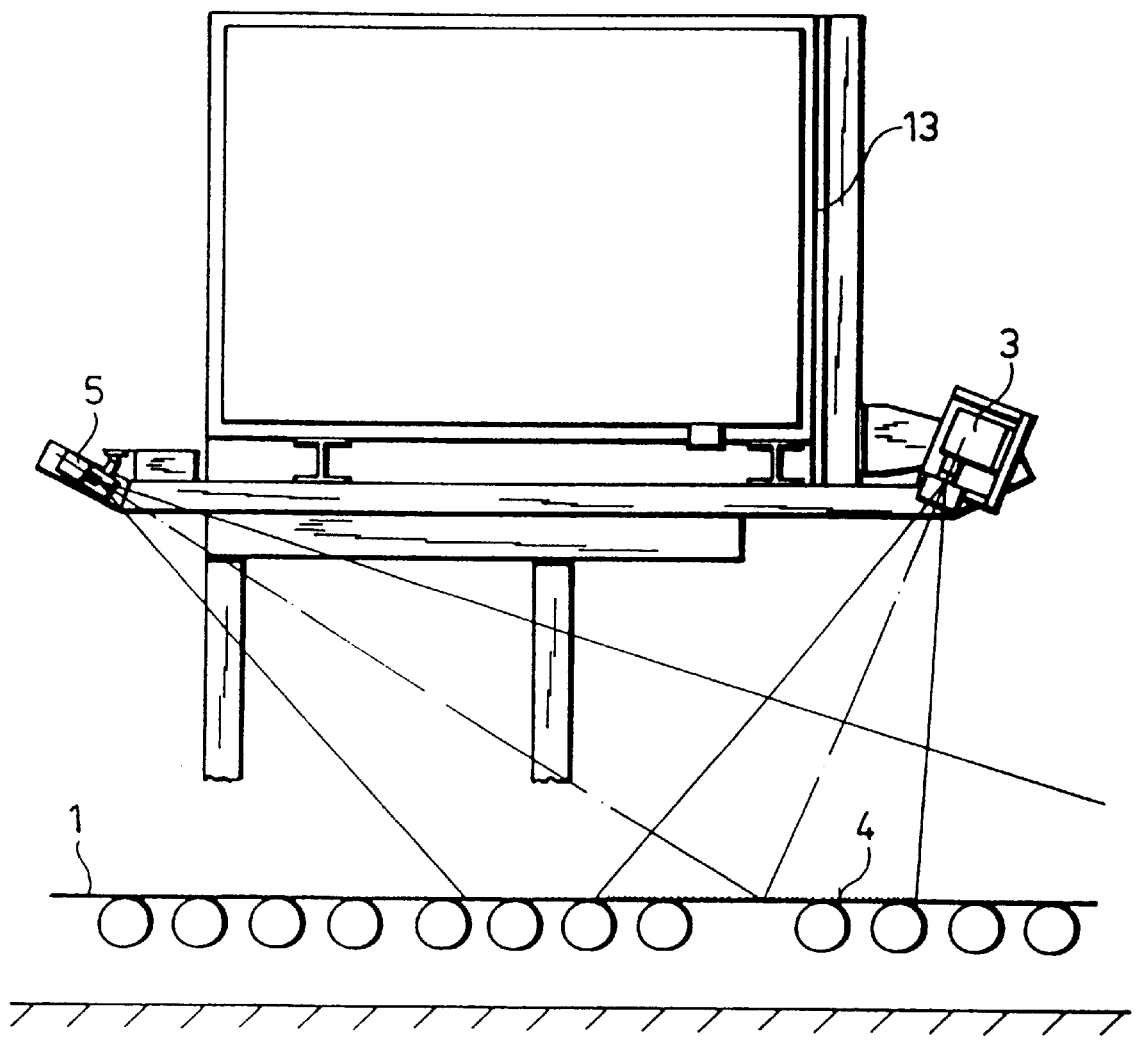
FIG. 3 shows the projector and the camera arranged before a coiler pit.

Measurement lines 2 running transverse to the strip 1 are produced on the measurement or strip surface 4 using a protector 3.

The measuring arrangement is disposed in one case in the run-out from the finishing stands 6 and in the other case before the coiler 7, on an instrument case 13. The CCD camera 5 is located on the side of the instrument case nearer to the coiler 7, in a water-cooled housing. The projector 3 is located on the side of the instrument case remote from the coiler 7. To remove heat the housing is cooled with air. The cooling of the projector 3 and of the camera 5 is necessary to remove their intrinsic heat and the radiant heat from the strip 1, which is at about 1000° C.

The camera 5 and the projector 3 are arranged in succession relative to the direction of travel of the strip and are aimed at a region of the strip located between them, on which the line pattern is produced and sampled. The projector used may, for example, be a xenon light source, which produces an easily readable line pattern even on a hot slab.

Unevenness on the strip surface 4 cause the measurement lines 2 to follow an irregular course or to depart from geometric straightness.

By means of a CCD camera 5 in the measurement lines 2, and consequently also the changes in their course caused by unevenness, are detected. After it has been detected the measurement image is compared by computer with a previously recorded reference pattern. The height differences and the parameters for the control of the finishing train are derived directly from the deviations.

A complete picture of the flatness of the strip 1 is thereby obtained as it moves along in the direction of the arrow.

Figure 4:
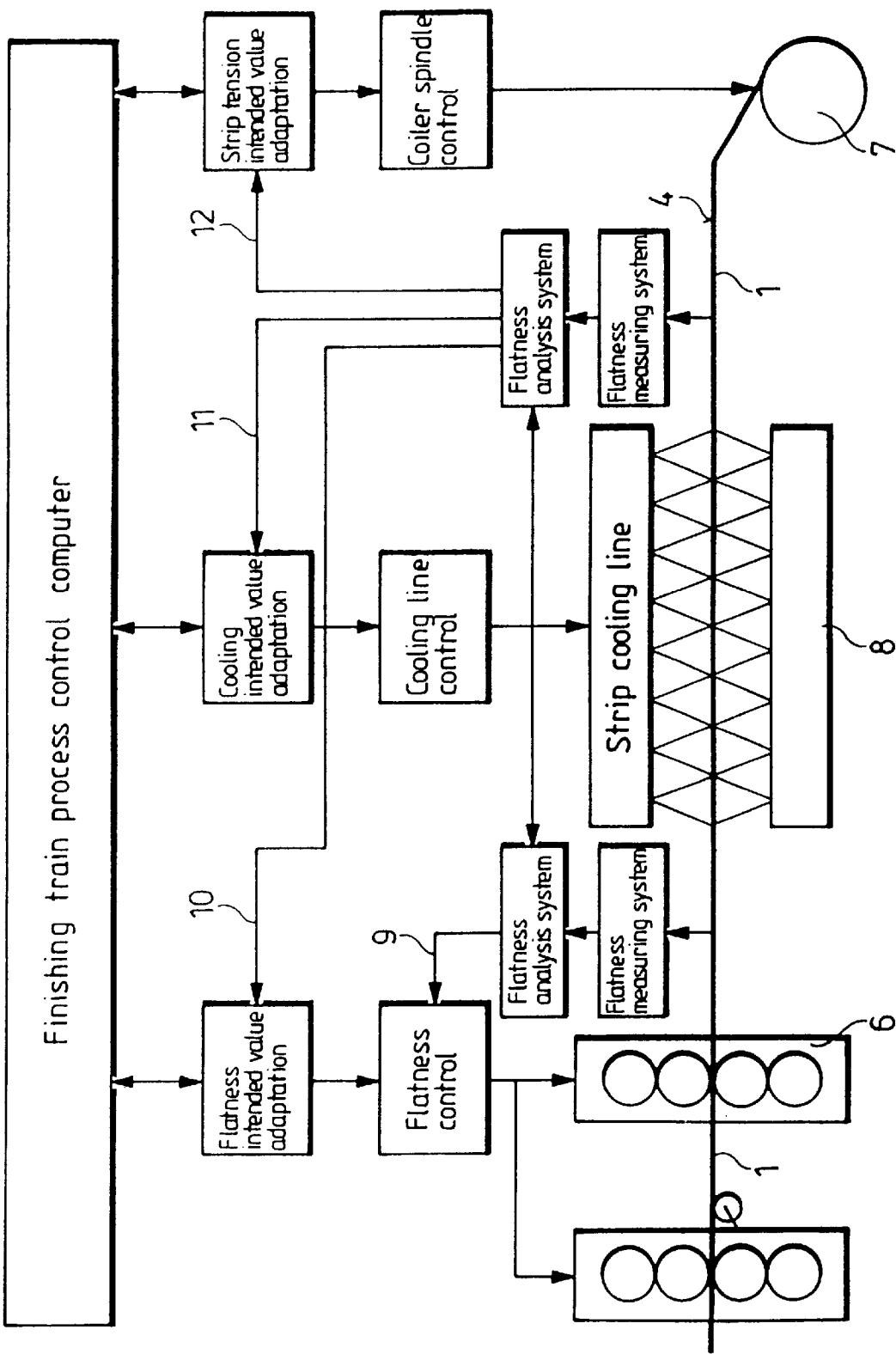
FIG. 4 is a block diagram of the flatness control system.

From the diagram of the flatness control system (FIG. 4) the design in accordance with the invention can be seen. The hot strip 1 passes through the finishing rolls 6 and the strip cooling line 8 to the coiler 7 in the coiler pit. In the runout from the finishing rolls 6 the flatness of the hot strip is detected, analysed and evaluated for control of the last stands of the finishing rolls (roll bending and tilting). This internal flatness-control loop 9 is supplemented by an external flatness-control loop 10. By a measurement of the strip flatness after the strip cooling line 8 before the coiler 7 the external flatness-control loop 1) is designed for adaptation of the intended value of the internal control loop.

Using the measured values detected after the strip cooling line a first secondary control loop 11 is also produced which permits the intended value for the cooling line 8 to be adapted and a second secondary control loop 12 which permits the intended value for the coiler tension 7 to be adapted.

Altogether, the detection and control in accordance with the invention can be used effectively to achieve a high strip flatness at the usual high finishing speeds of up to 25 m/s used in hot strip mills.

What is claimed is:

1. A rolling mill train comprising:
   a finishing stand;
   a strip cooling line;
   a coiler;
   first measuring means comprising a first CCD camera and a first projector, the first measuring means located before the strip cooling line; and
   second measuring means comprising a second CCD camera and a second projector, the second measuring means located after the strip cooling line, the first and second measuring means being configured to measure strip flatness;
   wherein the first and second measuring means are coupled with means for controlling the finishing stand, the strip cooling line and the coiler.

2. The rolling mill train of claim 1, wherein the strip flatness is detected in the run-out from the finishing line and is evaluated for control of the last stands of the finishing rolls, and measured values of the strip flatness are used to modify the flatness after the strip cooling stage and before the coiler.

* * * * *